(12) United States Patent
Longman et al.

(10) Patent No.: US 11,143,753 B2
(45) Date of Patent: Oct. 12, 2021

(54) RANGE EXTENSION WITH SEGMENTATION

(71) Applicant: GM GLOBAL TECHNOLOGY OPERATIONS LLC, Detroit, MI (US)

(72) Inventors: Oren Longman, Tel Aviv (IL); Shahar Villeval, Tel Aviv (IL); Igal Bilik, Rehovot (IL); Lior Kissos, Netanya (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 250 days.

(21) Appl. No.: 16/407,982

(22) Filed: May 9, 2019

(65) Prior Publication Data

US 2020/0355815 A1 Nov. 12, 2020

(51) Int. Cl.
*G01S 13/34* (2006.01)
*G01S 13/526* (2006.01)
*G01S 13/931* (2020.01)

(52) U.S. Cl.
CPC ............ *G01S 13/34* (2013.01); *G01S 13/526* (2013.01); *G01S 13/931* (2013.01)

(58) Field of Classification Search
CPC .............................. G01S 13/34; G01S 13/526
See application file for complete search history.

(56) References Cited

U.S. PATENT DOCUMENTS

| 8,390,506 B2* | 3/2013 | Focke | G01S 13/345 342/70 |
| 8,760,341 B2* | 6/2014 | Nakagawa | G01S 13/345 342/109 |
| 2003/0052813 A1* | 3/2003 | Natsume | G01S 7/354 342/70 |
| 2010/0289692 A1* | 11/2010 | Winkler | G01S 7/4008 342/70 |
| 2015/0198710 A1* | 7/2015 | Tokuhiro | G01S 13/36 342/104 |
| 2017/0343645 A1* | 11/2017 | Kim | B64C 3/38 |
| 2020/0233087 A1* | 7/2020 | Sekiguchi | G01S 17/86 |

* cited by examiner

*Primary Examiner* — Marcuse E Windrich
(74) *Attorney, Agent, or Firm* — Cantor Colburn LLP

(57) ABSTRACT

A vehicle, radar system of a vehicle and method of extending a range of the radar system. The radar system includes a transmitter antenna, a receiver antenna and a processor. The transmitter antenna transmits a reference signal. The receiver antenna receives an echo signal in response to reflection of the reference signal from an object located at a distance outside of the range limit of the radar system, wherein the range limit indicating a frequency sampling range. The processor generates a frequency peak for the object from the received echo signal, wherein the frequency peak lies outside of the frequency sampling range, shifts the frequency peak to within the frequency sampling range, and determines a range of the object using the frequency-shifted peak.

20 Claims, 4 Drawing Sheets

RANGE EXTENSION WITH SEGMENTATION

INTRODUCTION

The subject disclosure relates to radar systems and, in particular, to a system and method for operating a radar system to detect objects outside of a stated range limit of the radar system.

Vehicular radar systems can be used to detect an object within an environment of the vehicle by reflecting an electromagnetic wave off of the object and recording a time-of-flight required for the electromagnetic wave to return to the radar system. Various radar systems use a linear frequency modulated signal to probe the environment. These radar systems have a maximum range that is a function of a slope of the linear frequency modulated signal and a sampling rate of the radar system. There is a need to be able to determine the range of objects, even when the objects are outside of the range of the radar system.

SUMMARY

In one exemplary embodiment, a method of extending a range of a radar system is disclosed. A reference signal is transmitted from the radar system. An echo signal is received at the radar system in response to reflection of the transmitted reference signal from an object located at a distance outside of a range limit of the radar system, wherein the range limit indicates a frequency sampling range. A frequency peak is generated for the object from the received echo signal, wherein the frequency peak lies outside of the frequency sampling range. The frequency peak is shifted to within the frequency sampling range. The range of the object is determined using the frequency-shifted peak.

In addition to one or more of the features described herein, the reference signal is a linear frequency modulated signal and the range limit is related to a slope of the linear frequency modulated reference signal. A band pass filter is applied to the frequency peak. In one embodiment, the frequency peak is shifted by a selected frequency shift, and the band pass filter is then applied to the frequency-shifted peak. Alternatively, the band pass filter is applied to the frequency peak and the frequency peak is then shifted to within the frequency sampling range. The band pass filter is one of a plurality of band pass filters that are one of: (i) filters that extend over the frequency sampling range without overlapping each other; and (ii) filters that define one or more non-contiguous frequency ranges with at least one of the filter ranges being outside of the frequency sampling range and that can be frequency-shifted to extend over the entirety of the frequency range without overlapping each other. A time delay is added to the reference signal to obtain a time-delayed reference signal and the time-delayed reference signal is mixed with the echo signal to shift the frequency of the frequency peak corresponding to the echo signal.

In another exemplary embodiment, a radar system for a vehicle is disclosed. The radar system includes a transmitter antenna, a receiver antenna and a processor. The transmitter antenna transmits a reference signal. The receiver antenna receives an echo signal in response to reflection of the reference signal from an object located at a distance outside of the range limit of the radar system, wherein the range limit indicates a frequency sampling range. The processor generates a frequency peak for the object from the received echo signal, wherein the frequency peak lies outside of the frequency sampling range, shifts the frequency peak to within the frequency sampling range, and determines a range of the object using the frequency-shifted peak.

In addition to one or more of the features described herein, the reference signal is a linear frequency modulated signal and the range limit is related to a slope of the linear frequency modulated reference signal. The processor is further configured to apply a band pass filter to the frequency peak. In one embodiment, the processor is further configured to shift the frequency peak by a selected frequency shift, and apply the band pass filter to the frequency-shifted peak. Alternatively, the processor is further configured to apply the band pass filter to the frequency peak, and shift the frequency peak to within the frequency sampling range. The band pass filter is one of a plurality of band pass filters that are one of: (i) filters that extend over the frequency sampling range without overlapping each other; and (ii) filters that define one or more non-contiguous frequency ranges with at least one of the filter ranges being outside of the frequency sampling range and that can be frequency-shifted to extend over the entirety of the frequency range without overlapping each other. The processor is further configured to add a time delay to the signal to obtain a time-delayed reference signal, and mix the time-delayed reference signal with the echo signal to shift the frequency of the frequency peak corresponding to the echo signal.

In yet another exemplary embodiment, a vehicle is disclosed. The vehicle includes a transmitter antenna, a receiver antenna and a processor. The transmitter antenna is configured to transmit a reference signal. The receiver antenna is configured to receive an echo signal in response to reflection of the reference signal from an object located at a distance outside of the range limit of the radar system, wherein the range limit indicates a frequency sampling range. The processor is configured to: generate a frequency peak for the object from the received echo signal, wherein the frequency peak lies outside of the frequency sampling range; shift the frequency peak to within the frequency sampling range; and determine a range of the object using the frequency-shifted peak.

In addition to one or more of the features described herein, the reference signal is a linear frequency modulated signal and the range limit is related to a slope of the linear frequency modulated reference signal. The processor is further configured to apply a band pass filter to the frequency peak. The processor is further configured to perform one of: (i) shifting the frequency peak by a selected frequency shift, and applying the band pass filter to the frequency-shifted peak; and (ii) applying the band pass filter to the frequency peak, and shifting the frequency peak to within the frequency sampling range. The band pass filter is one of a plurality of band pass filters that are one of: (i) filters that extend over the frequency sampling range without overlapping each other; and (ii) filters that define one or more non-contiguous frequency ranges with at least one of the filter ranges being outside of the frequency sampling range and that can be frequency-shifted to extend over the entirety of the frequency range without overlapping each other. The processor is further configured to add a time delay to the signal to obtain a time-delayed reference signal, and mix the time-delayed reference signal with the echo signal to shift the frequency of the frequency peak corresponding to the echo signal.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
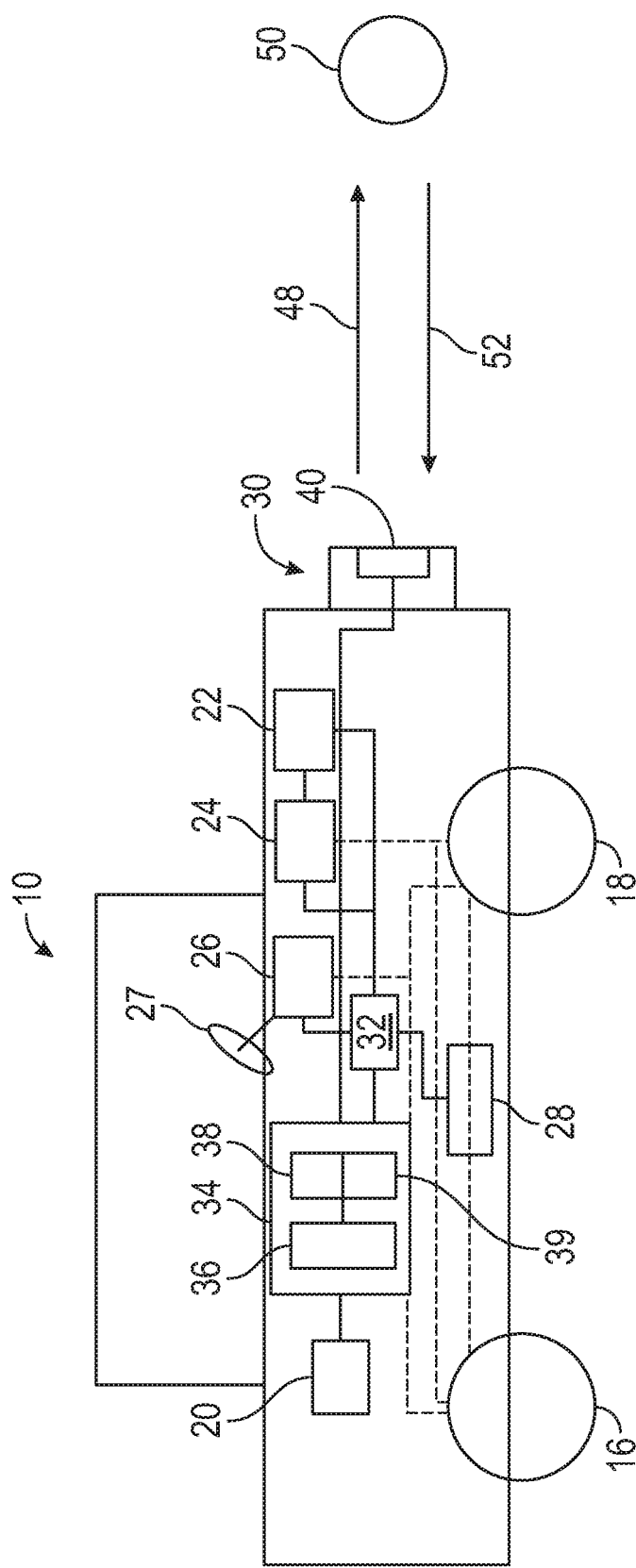
FIG. 1 shows an autonomous vehicle in an illustrative embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows an autonomous vehicle 10. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

The autonomous vehicle 10 generally includes at least a navigation system 20, a propulsion system 22, a transmission system 24, a steering system 26, a brake system 28, a sensor system 30, an actuator system 32, and a controller 34. The navigation system 20 determines a trajectory plan for automated driving of the autonomous vehicle 10. The propulsion system 22 provides power for creating a motive force for the autonomous vehicle 10 and may, in various embodiments, include an internal combustion engine, an electric machine such as a traction motor, and/or a fuel cell propulsion system. The transmission system 24 is configured to transmit power from the propulsion system 22 to wheels 16 and 18 of the autonomous vehicle 10 according to selectable speed ratios. The steering system 26 influences a position of the wheels 16 and 18. While depicted as including a steering wheel 27 for illustrative purposes, in some embodiments contemplated within the scope of the present disclosure, the steering system 26 may not include a steering wheel 27. The brake system 28 is configured to provide braking torque to the wheels 16 and 18.

The sensor system 30 includes a radar system 40 that senses objects in an exterior environment of the autonomous vehicle 10 and provides various parameters of the objects, such as a range of the object, Doppler frequency or relative radial velocity of the object, elevation, azimuth, etc. In operation, the radar system 40 sends out a radio frequency (RF) reference signal 48 that is reflected back at the autonomous vehicle 10 by one or more objects 50 in the field of view of the radar system 40 as one or more reflected echo signals 52.

The actuator system 32 includes one or more actuators that control one or more vehicle features such as, but not limited to, the propulsion system 22, the transmission system 24, the steering system 26, and the brake system 28.

The controller 34 includes a processor 36 and a computer readable storage device or media 38. The computer readable storage medium includes programs or instructions 39 that, when executed by the processor 36, operate the radar system 40 in order to obtain the various parameters of the object 50. The computer readable storage medium 38 may further include programs or instructions 39 that when executed by the processor 36, operate the navigation system 20 and/or the actuator system 32 according to the various parameters of the one or more objects 50 obtained by the radar system 40 in order to navigate the autonomous vehicle 10 with respect to the object 50.

The navigation system 20 builds a trajectory for the autonomous vehicle 10 based on data from the radar system 40 and any other parameters. The controller 34 can provide the trajectory to the actuator system 32 to control the propulsion system 22, transmission system 24, steering system 26 and/or brake system 28 in order to navigate the autonomous vehicle 10 with respect to the object 50.

Figure 2:
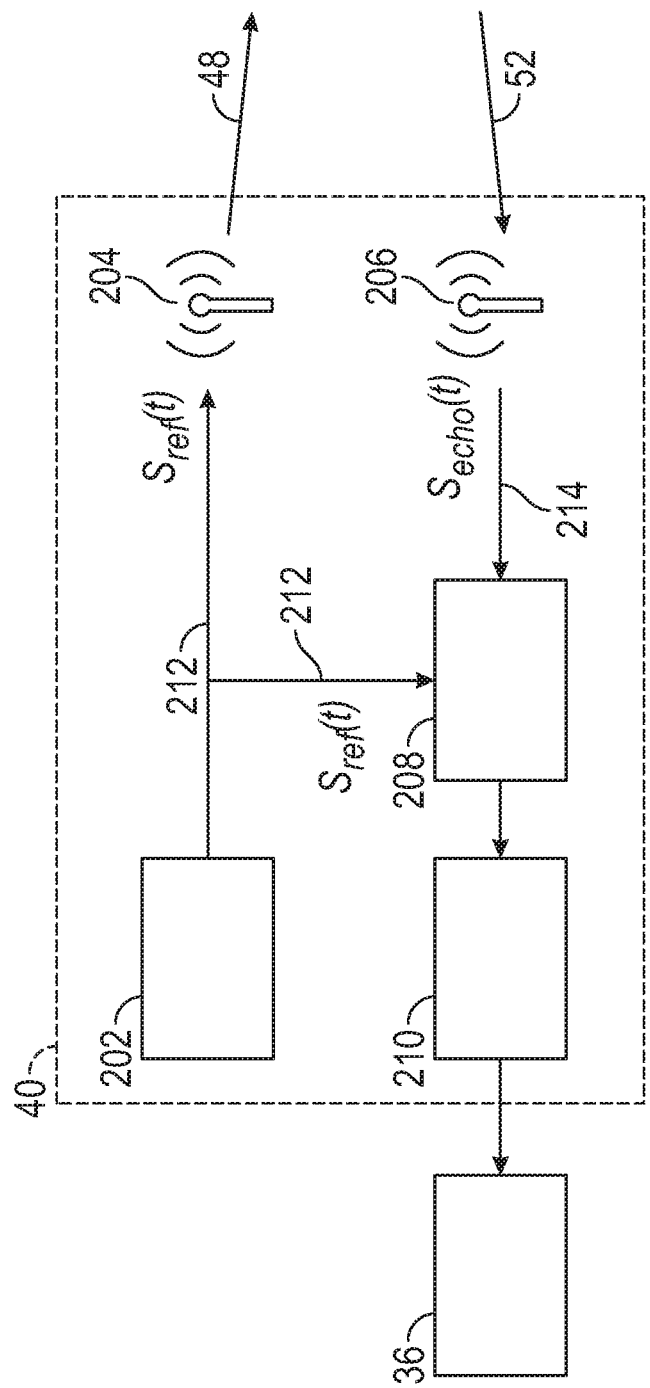
FIG. 2 shows a schematic diagram of the radar system of FIG. 1 in various embodiments.

FIG. 2 shows a schematic diagram of the radar system 40 of FIG. 1 in various embodiments. The radar system 40 includes a signal generator 202, a transmitter antenna 204, a receiver antenna 206, a down converter 208 and an analog-to-digital converter 210. It is to be understood that the radar system 40 can include additional circuitry (not shown in FIG. 2) for sampling and processing of the digital signal in order to determine certain radar parameters such as range, Doppler frequency, elevation and range of various objects.

The signal generator 202 generates an electronic reference signal $s_{ref}(t)$ 212 that is sent to the transmitter antenna 204. The transmitter antenna 204 transmits an electromagnetic reference signal or radio frequency (RF) reference signal 48 into the surrounding neighborhood or environment based on the electronic reference signal 212. In various embodiments, the electronic reference signal 212 (and the resulting RF reference signal 48) is a linear frequency modulated signal, also known as a "chirp signal." The chirp signal is a pulsed signal having a selected duration, with a frequency of the chirp signal increasing from an initial frequency to a final frequency in a linear manner as described below in Eq. (1):

$$f_{chirp} = f_0 + \alpha t \qquad \text{Eq. (1)}$$

where $f_0$ is the initial frequency and $\alpha$ is the slope of the linear frequency modulated signal or "chirp slope." A range limit ($Range_{max}$) of the radar system 40 is related to the chirp slope $\alpha$ via Eq. (2):

$$Range_{max} = \frac{f_s}{\alpha} \frac{c}{2} \qquad \text{Eq. (2)}$$

where $f_s$ is a sampling frequency of the radar system 40 and c is the speed of light.

The transmitted RF reference signal 48 reflects off of one or more objects 50 in the environment, creating one or more RF echo signals 52, with each RF echo signal being representative of a reflection. The one or more objects 50 can be at various distances from the radar system 40.

The one or more RF echo signals 52 are received at the receiver antenna 206, which converts the RF echo signals to electronic echo signal $s_{echo}(t)$ that serves as an input signal 214 to the down converter 208. The down converter 208 mixes the electronic reference signal 212 with the input signal 214 in order to obtain a frequency spectrum related to the input signal 214. The resulting signal generated by the down converter 208 is converted to a digital signal at the analog-to-digital converter (ADC) 210. The digitized signal can then be provided to other circuitry, such as processor 36, for determining various parameters of the one or more objects 50, such as range, etc.

In various scenarios at least one of the one or more objects 50 can reside at a distance that is greater than the range limit ($Range_{max}$) of the radar system 40. In various embodiments, the radar system 40 and, in particular, the down converter 208 is able to determine a range of this "out-of-range" object using the methods disclosed herein.

Under standard operating conditions, the reference signal results in reflections that generate corresponding frequency peaks within a frequency sampling range that extends from zero frequency to a sampling frequency $f_s$ of the radar system. A low-pass filter having the sampling frequency as its cutoff frequency is applied to the frequency sampling range in order to remove high frequency noise and aliasing effects. The present invention increases the range of the radar system 40 by receiving frequencies within an expanded frequency range that is greater than the frequency sampling range of the radar system, dividing the extended frequency range to obtain frequency sub-ranges centered on relevant peaks (e.g., peaks related to objects outside of the stated range of the radar system) and down-shifting these frequency sub-ranges appropriately so that they fit within the frequency sampling range without overlap. In various embodiments, the extended frequency range is obtained by dividing the frequency sampling range into a selected number of sub-ranges and spacing the sub-ranges according to a criterion or algorithm. This will result in regions of the extended frequency range that are not covered or sampled. Thus, some distances are not covered by the extended frequency range.

The method disclosed herein further involves replacing the low pass filter used in standard filtering operations with an equivalent bank of band pass filters. In one embodiment, these band pass filters can be applied to the frequency sub-ranges after they have been down-shifted into the frequency sampling range. Alternatively, the band pass filters or can be up-shifted in frequency using the spacing algorithm or criterion discussed above and applied to frequency sub-ranges as they reside within the extended frequency range, after which these frequency sub-ranges can be down-shifted into the frequency sampling range by reversing the algorithm or criterion discussed above. These methods are discussed in further detail below.

Figure 3:
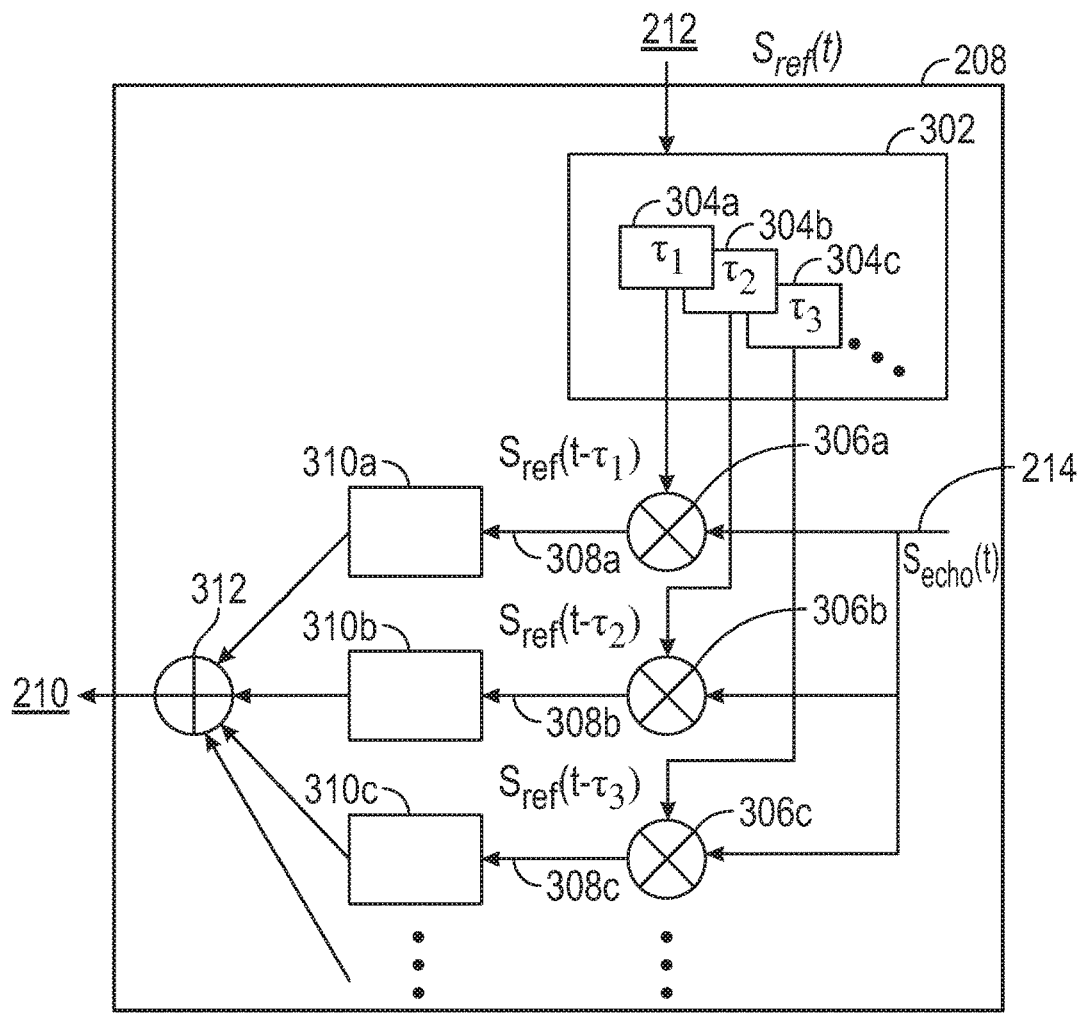
FIG. 3 shows a schematic diagram of a down converter of the radar system in one embodiment that can be used to extend the range of the radar system beyond its range limit.

FIG. 3 shows a schematic diagram of a down converter 208 of the radar system 40 in one embodiment that can be used to extend the range of the radar system beyond its range limit. The down converter 208 includes a plurality of mixers, although only three mixers 306a, 306b, 306c are explicitly shown for illustrative purposes. Each mixer 306a, 306b, 306c is devoted to a selected frequency range. The mixers 306a, 306b, 306c are connected in parallel with each other so that each mixer 306a, 306b, 306c receives the input signal 214 and an appropriately time-delayed reference signal and performs a correlation of the time-delayed reference signal with the input signal 214 to obtain correlated signals 308a, 308b, 308c. Each mixer 306a, 306b, 306c has an associated bandpass filter circuit 310a, 310b, 310c that filters their respective correlated signals 308a, 308b, 308c. The filtered signals can be combined at a summer 312, and the combined signal is output to the ADC 210.

In operation, the down converter 208 receives both the electronic reference signal $s_{ref}(t)$ 212 and the input signal $s_{echo}(t)$ 214. The electronic reference signal $s_{ref}(t)$ is received at a time delay circuit 302. The time delay circuit 302 creates a plurality of time-delayed reference signals from the original electronic reference signal 212 which are sent, respectively, to mixers 306a, 306b, 306c. For example, the time delay circuit 302 generates a first time-delayed reference signal by adding a first time delay ($\tau_1$ 304a) and sends the first time-delayed reference signal to the first mixer 306a. Specifically with regard to the first mixer 306a, the time delay circuit 302 receives reference signal $s_{ref}(t)$ which has a waveform as shown in Eq. (3):

$$s_{ref}(t) = \exp(2\pi j(f_0 + \tfrac{1}{2}\alpha t)t) \qquad \text{Eq. (3)}$$

and adds the first time delay $\tau_1$ to generate the first time-delayed signal having a waveform as shown in Eq. (4):

$$s_{ref}(t-\tau_1) = \exp(2\pi j(f_0 + \tfrac{1}{2}\alpha(t-\tau_1))(t-\tau_1)) \qquad \text{Eq. (4)}$$

Similarly, the time delay circuit 302 generates a second time-delayed reference signal by adding a second time delay ($\tau_2$, 304b), where $\tau_2 > \tau_1$, to the reference signal to obtain waveform as shown in Eq. (5):

$$s_{ref}(t-\tau_2) = \exp(2\pi j(f_0 + \tfrac{1}{2}\alpha(t-\tau_2))(t-\tau_2)) \qquad \text{Eq. (5)}$$

Similarly, the process can be used to added a third time delay ($\tau_3$, 304c), where $\tau_3 > \tau_2$ to obtain the third time-delayed reference signal, and the $n^{th}$ time delay $\tau_n$ to generate the $n^{th}$ time delayed waveform. Each mixer 306a, 306b, 306c mixes its respective time-delayed reference signal with the input signal 214 to generate correlated signals 308a, 308b, 308c which are in the form of frequency-shifted spectra.

The amount by which a frequency-shifted spectrum is shifted is related to the applied time delay. In particular, for a reference signal $s_{ref}(t)$ in the form of a chirp signal having chirp rate $\alpha$ $$\left[ \frac{Hz}{sec} \right],$$

the frequency shift $f_n$ is related to the applied time delay $\tau_n$ by Eq. (6):

$$f_n = \alpha \cdot \tau_n \qquad \text{Eq. (6)}$$

The band pass filter corresponding to a selected mixer is designed to filter the signal over a range of frequencies centered on the shifted frequency signal.

Figure 4:
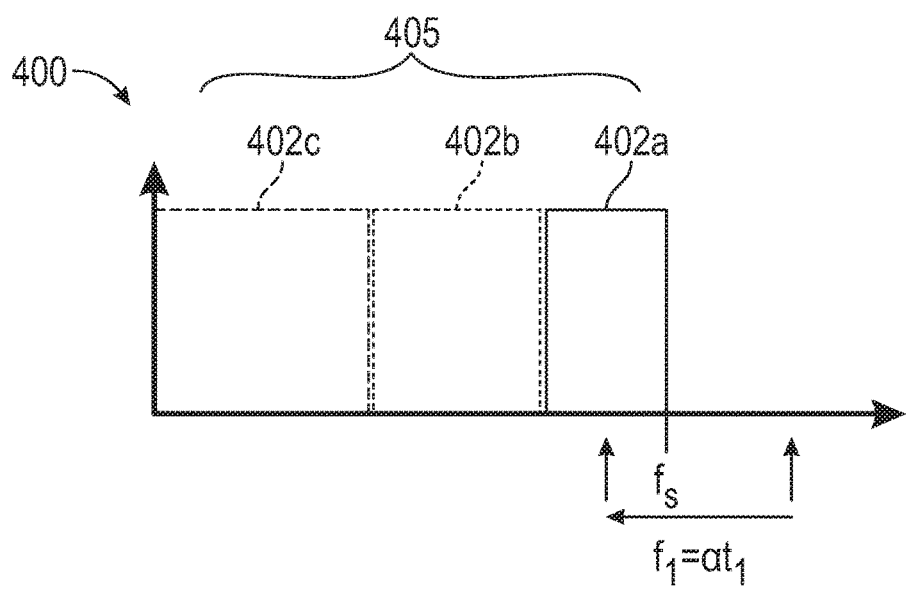
FIG. 4 shows a frequency spectrum illustrating a distribution of the band pass filters applied by respective band pass filter circuits.

Once the signals have been frequency-shifted and filtered, they are summed using a summer 312 into a single frequency spectrum that extends over the frequency sampling range 405, FIG. 4 of the radar system 40.

FIG. 4 shows a frequency spectrum 400 illustrating a distribution of the band pass filters 402a, 402b, 402c applied by respective band pass filter circuits 310a, 310b, 310c. The band pass filters 402a, 402b, 402c are non-overlapping. However, the combination of the band pass filters 402a, 402b, 402c covers each frequency over the frequency sampling range 405, from a zero frequency to a cutoff frequency $f_s$, where the cutoff frequency is related to the range limit of the radar system. Each band pass filter 402a, 402b, 402c covers a region of the frequency sampling range 405 into which their respectively frequency peaks are frequency-shifted upon application of the appropriate time-delay.

It can be therefore seen that an object that is outside of a range limit of the radar system can be observed by the radar system using the methods and down converter 208 disclosed with respect to FIG. 3 and FIG. 4. This object creates an echo signal at a frequency of $f_1$ that is greater than the cutoff frequency $f_s$ of the radar system 40. The down converter 208 shifts the signal to a frequency $f_1'$ that is less than the cut-off frequency, thereby allowing the object to be detected by the radar system 40. The bandpass filter 402a is applied on the shifted signal in order to reject aliasing signals in addition to signals from other frequency regions.

Figure 5:
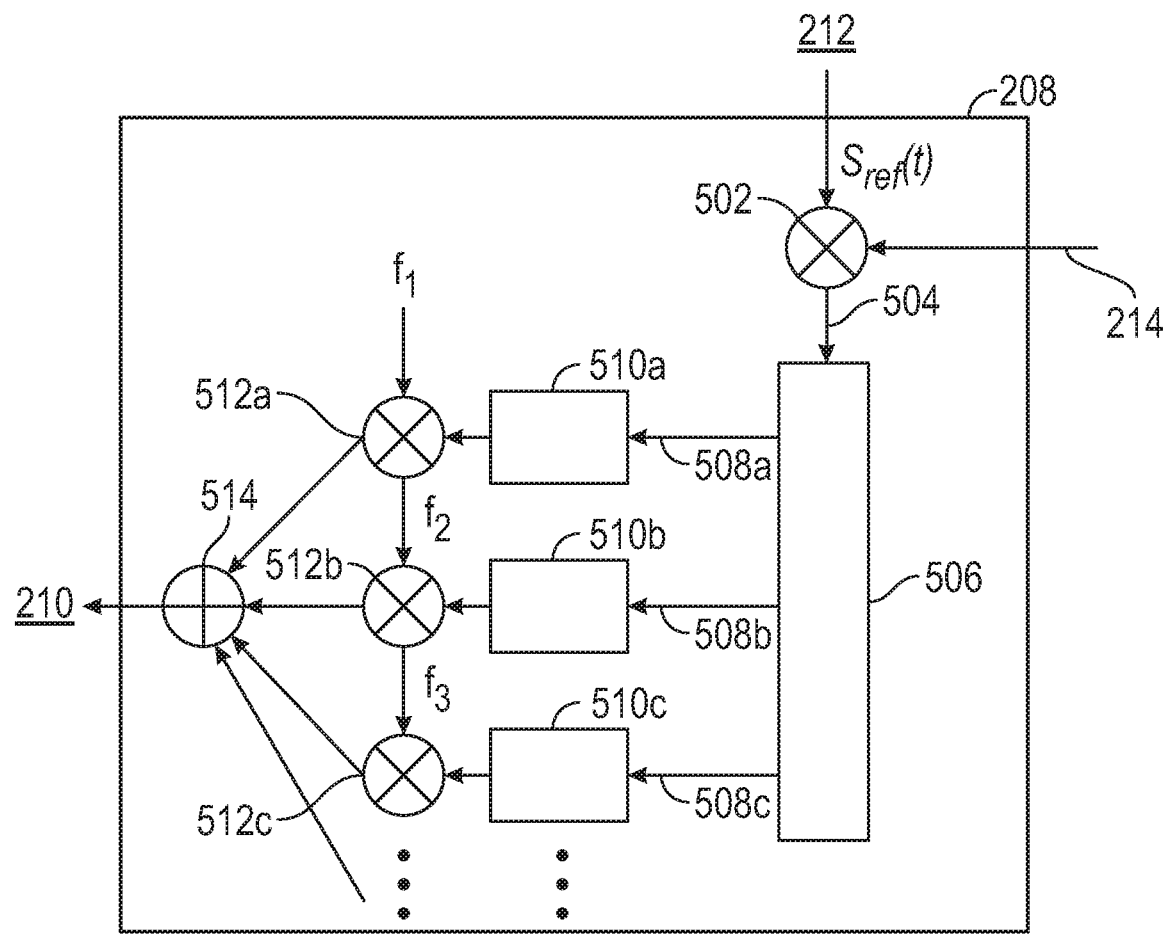
FIG. 5 shows a schematic diagram of a down converter in an alternate embodiment that can be used to extend the range of the radar system beyond its range limit.

FIG. 5 shows a schematic diagram of a down converter 208 in an alternate embodiment that can be used to extend the range of the radar system beyond its range limit. The down converter 208 includes a single delay block 502 that receives the reference signal 212 and the input signal 214 and generates frequency spectrum 504. The frequency spectrum 504 is sent to a splitter 506 that splits the spectrum to generate a plurality of spectrum duplicates 508a, 508b, 508c Each spectrum duplicate 508a, 508b, 508c is sent to a designated band pass filter circuit 510a, 510b, 510c to remove unwanted signals. As an illustrative example, first spectrum duplicate 508a is sent to first band pass filter circuit 510a, second spectrum duplicate 508b is sent to the second band pass filter circuit 510b and the third spectrum duplicate 508c is sent to the third band pass filter circuit 510c. Each band pass filter 510a, 510b and 510c covers a frequency region which corresponds to a different range. The filtered signals are then sent to respective frequency shifters 512a, 512b and 512c. Each frequency shifter 512a, 512b, 512c shifts their respective filtered spectrum duplicate by the appropriate frequency shift (e.g., $f_1$, $f_2$, $f_3$). The filtered signals are then combined at a summer 514 to obtain a combined frequency spectrum. The combined frequency spectrum is output to the ADC 210.

Figure 6:
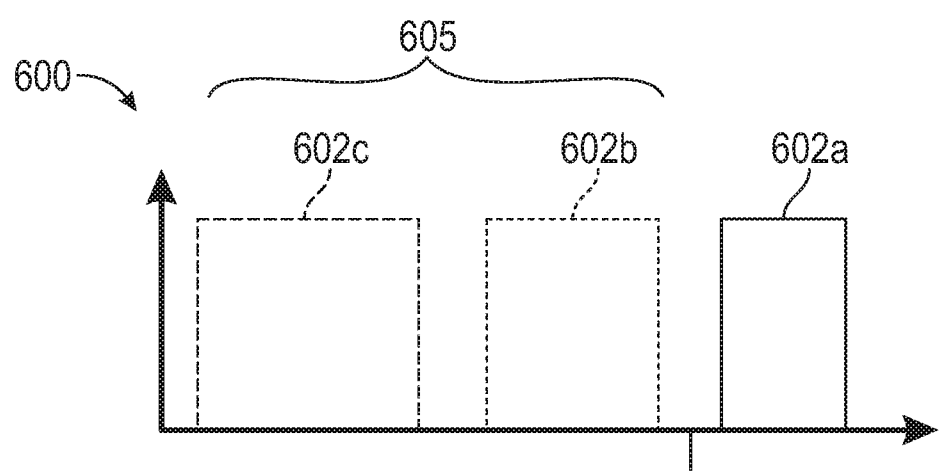
FIG. 6 shows a frequency spectrum illustrating a distribution of the band pass filters in the down converter of FIG. 5.

FIG. 6 shows a frequency spectrum 600 illustrating a distribution of the band pass filters in the down converter 208 of FIG. 5. The band pass filters 602a, 602b, 602c have bandwidths that cover frequency ranges that are non-overlapping. The band pass filter 602a 602b, 602c are up-shifted to extend outside of the frequency sampling range 605. At least one band pass filter covers a frequency range corresponding to an echo signal received from an object that is at a distance outside of the range limit of the radar system 40.

In the down converters 208 disclosed with respect to FIGS. 3 and 5, it is clear that a single frequency sub-range can be selected and/or isolated from the plurality of frequency sub-ranges. Therefore the down converters 208 can be operated to select a single frequency peak or, equivalently, to isolate a selected range for viewing by selecting a single processing branch of the down converter 208 (i.e., a single mixer and band pass filter circuit).

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of extending a detection range of a vehicle, comprising:
   transmitting a reference signal from a transmitter antenna of a radar system of the vehicle;
   receiving an echo signal at a receiver antenna of the radar system in response to reflection of the transmitted reference signal from an object located at a distance outside of a range limit of the radar system, wherein the range limit indicates a frequency sampling range;
   generating, at a processor, a frequency peak for the object from the received echo signal, wherein the frequency peak lies outside of the frequency sampling range;
   shifting, at the processor, the frequency peak to within the frequency sampling range;
   determining, at the processor, a range of the object using the frequency-shifted peak; and
   providing the range of the object to the vehicle to operate the vehicle.

2. The method of claim 1, wherein the reference signal is a linear frequency modulated signal and the range limit is related to a slope of the linear frequency modulated reference signal.

3. The method of claim 1, further comprising applying a band pass filter to the frequency peak at the processor.

4. The method of claim 3, further comprising shifting the frequency peak by a selected frequency shift and applying the band pass filter to the frequency-shifted peak.

5. The method of claim 3, further comprising applying the band pass filter to the frequency peak and shifting the frequency peak to within the frequency sampling range.

6. The method of claim 3, wherein the band pass filter is one of a plurality of band pass filters that are one of: (i) filters that extend over the frequency sampling range without overlapping each other; and (ii) filters that define one or more non-contiguous frequency ranges with at least one of the filter ranges being outside of the frequency sampling range and that can be frequency-shifted to extend over the entirety of the frequency range without overlapping each other.

7. The method of claim 1, further comprising adding, at the processor, a time delay to the reference signal to obtain a time-delayed reference signal, and mixing the time-delayed reference signal with the echo signal to shift the frequency of the frequency peak corresponding to the echo signal.

8. A radar system for a vehicle, comprising:
   a transmitter antenna configured to transmit a reference signal;
   a receiver antenna configured to receive an echo signal in response to reflection of the reference signal from an object located at a distance outside of the range limit of the radar system, wherein the range limit indicates a frequency sampling range; and
   a processor configured to:
   generate a frequency peak for the object from the received echo signal, wherein the frequency peak lies outside of the frequency sampling range;
   shift the frequency peak to within the frequency sampling range; and
   determine a range of the object using the frequency-shifted peak.

9. The radar system of claim 8, wherein the reference signal is a linear frequency modulated signal and the range limit is related to a slope of the linear frequency modulated reference signal.

10. The radar system of claim 8, wherein the processor is further configured to apply a band pass filter to the frequency peak.

11. The radar system of claim 10, wherein the processor is further configured to shift the frequency peak by a selected frequency shift and apply the band pass filter to the frequency-shifted peak.

12. The radar system of claim 10, wherein the processor is further configured to apply the band pass filter to the frequency peak and shift the frequency peak to within the frequency sampling range.

13. The radar system of claim 10, wherein the band pass filter is one of a plurality of band pass filters that are one of: (i) filters that extend over the frequency sampling range without overlapping each other; and (ii) filters that define one or more non-contiguous frequency ranges with at least one of the filter ranges being outside of the frequency sampling range and that can be frequency-shifted to extend over the entirety of the frequency range without overlapping each other.

14. The radar system of claim 8, wherein the processor is further configured to add a time delay to the signal to obtain a time-delayed reference signal, and mix the time-delayed reference signal with the echo signal to shift the frequency of the frequency peak corresponding to the echo signal.

15. A vehicle, comprising:
a transmitter antenna configured to transmit a reference signal;
a receiver antenna configured to receive an echo signal in response to reflection of the reference signal from an object located at a distance outside of the range limit of the radar system, wherein the range limit indicates a frequency sampling range; and
a processor configured to:
generate a frequency peak for the object from the received echo signal, wherein the frequency peak lies outside of the frequency sampling range;
shift the frequency peak to within the frequency sampling range; and
determine a range of the object using the frequency-shifted peak.

16. The vehicle of claim 15, wherein the reference signal is a linear frequency modulated signal and the range limit is related to a slope of the linear frequency modulated reference signal.

17. The vehicle of claim 15, wherein the processor is further configured to apply a band pass filter to the frequency peak.

18. The vehicle of claim 17, wherein the processor is further configured to perform one of: (i) shifting the frequency peak by a selected frequency shift, and applying the band pass filter to the frequency-shifted peak; and (ii) applying the band pass filter to the frequency peak, and shifting the frequency peak to within the frequency sampling range.

19. The vehicle of claim 17, wherein the band pass filter is one of a plurality of band pass filters that are one of: (i) filters that extend over the frequency sampling range without overlapping each other; and (ii) filters that define one or more non-contiguous frequency ranges with at least one of the filter ranges being outside of the frequency sampling range and that can be frequency-shifted to extend over the entirety of the frequency range without overlapping each other.

20. The vehicle of claim 15, wherein the processor is further configured to add a time delay to the signal to obtain a time-delayed reference signal, and mix the time-delayed reference signal with the echo signal to shift the frequency of the frequency peak corresponding to the echo signal.

* * * * *